(12) United States Patent
    Zargarian et al.

(10) Patent No.: US 10,229,250 B2
(45) Date of Patent: Mar. 12, 2019

(54) SYSTEM, METHOD AND APPLICATION FOR TRANSCODING DATA INTO MEDIA FILES

(71) Applicant: AREBUS LLC, Arlington, MA (US)

(72) Inventors: Edwin Zargarian, Arlington, MA (US); Eric Bravick, Traverse City, MI (US)

(73) Assignee: Arebus, LLC, Santa Monica, CA (US)

( * ) Notice: Subject to any disclaimer, the term of this patent is extended or adjusted under 35 U.S.C. 154(b) by 205 days.

(21) Appl. No.: 15/043,737

(22) Filed: Feb. 15, 2016

(65) Prior Publication Data

US 2016/0239642 A1    Aug. 18, 2016

Related U.S. Application Data

(60) Provisional application No. 62/116,682, filed on Feb. 16, 2015.

(51) Int. Cl.
    *G06F 21/10* (2013.01)
    *G06F 21/60* (2013.01)
    *H04L 29/06* (2006.01)

(52) U.S. Cl.
    CPC ............ *G06F 21/10* (2013.01); *G06F 21/602* (2013.01); *G06F 21/606* (2013.01); *H04L 63/0428* (2013.01); *H04L 63/101* (2013.01); *G06F 2221/0724* (2013.01)

(58) Field of Classification Search
    CPC ...... G06F 21/10; G06F 21/602; G06F 21/606; H04L 63/0428; H04L 63/101
    See application file for complete search history.

(56) References Cited

U.S. PATENT DOCUMENTS

| | | | | |
|---|---|---|---|---|
| 5,497,463 | A * | 3/1996 | Stein | G06F 9/547 703/20 |
| 7,113,523 | B1 * | 9/2006 | Kubota | H04L 63/0428 348/729 |
| 2002/0009000 | A1 * | 1/2002 | Goldberg | G06F 21/10 365/200 |
| 2002/0136426 | A1 * | 9/2002 | Davis | G06F 21/10 382/100 |
| 2012/0287237 | A1 * | 11/2012 | Piccinelli | H04N 19/597 348/43 |
| 2013/0073854 | A1 * | 3/2013 | Patti | H04L 9/0825 713/171 |
| 2013/0305383 | A1 * | 11/2013 | Garralda | G06Q 30/00 726/26 |
| 2014/0019767 | A1 * | 1/2014 | Jarnikov | H04N 5/913 713/176 |

* cited by examiner

*Primary Examiner* — Joseph P Hirl
*Assistant Examiner* — Sayed Aresh Beheshti Shirazi
(74) *Attorney, Agent, or Firm* — Schwegman Lundberg & Woessner, P.A.

(57) ABSTRACT

A data transcoding device includes a memory device for storing clear data containing private information and a processor configured as a data transcoder. The processor is configured to create packets of the clear data, prepare the packets for transcoding the clear data into an indecipherable multimedia data file appearing as noise, by determining properties of the indecipherable multimedia file based on parameters of the clear data. The processor is configured to generate the indecipherable multimedia file by transcoding the clear data based on the determined properties.

12 Claims, 17 Drawing Sheets

SYSTEM, METHOD AND APPLICATION FOR TRANSCODING DATA INTO MEDIA FILES

CROSS REFERENCE TO RELATED APPLICATIONS

This application claims benefit of priority to U.S. Provisional Application No. 62/116,682, filed Feb. 16, 2015, the contents of such application being incorporated by reference herein.

FIELD

The subject matter of the present invention is a system, method and application for electronic data processing and exchange, and more particularly, to a system, method and application for sending data from one end user to one or more end user(s) using a media based system.

BACKGROUND

Electronic messaging (e.g. e-mail, text) and transfer of data (e.g. images, video, documents) (collectively referred to hereafter as "data") has become a primary means of communication for a large number of organizations, businesses and individuals. Data exists in a plethora of file formats (e.g. portable document format (pdf), joint photographic experts group (jpeg), Powerpoint (ppt), executable file (exe), etc.) which are defined as standard methods that information is encoded for storage in a computer file. The enormous variety and application of these file formats allow for specific functionality and purpose built into each piece of data.

Currently, popular social media transmission methods, such as Facebook, Google+ or Imugr are limited in what type of file formats they support for the transmission of data. Specifically, social media application only support text, image and video file formats, thus limiting the type of data that may be transmitted through social media applications. Similar to the social media methods, some business applications are also built to only store and send certain multimedia file formats (photos, videos, audio files, etc.), making it complex to simply add encryption to the workflow.

Furthermore, current data transmission applications are an inherently insecure means of communication given that all messages, images, documents or other media sent between senders and recipients are transmitted over networks, and rely upon the security strength of the applications and networks facilitating the transmission. This problem is exacerbated by the fact that privacy controls are in the hands of $3^{rd}$ party application and services providers. Hence, when an email or file is sent or a picture posted/stored online, the user has little-to-no control over that content above what the online service is offering. In some cases, the online services "own" your content and do not offer any way to permanently delete the pictures or content once they are transmitted to the online services. In addition to owning user content, this user content is not encrypted when stored on servers of these online services (e.g. Facebook, medical applications, etc.). Thus, if a hacker is able to hack into the server, then user content (e.g. pictures) can easily be downloaded and viewed since they themselves are not encrypted. As an analogy, the modern equivalent of sending data is like sending a postcard, which allows anyone who comes in contact with the postcard to read/copy/retransmit the context without any recourse.

For the longest time, this fact has not deterred a large portion of data users to continue using conventional means for transmitting data as a conduit for sensitive, confidential material. While some users, and/or the organizations they belong to, have started using encryption as a means to secure the transfer of data, the vast majority of users have to continue to transfer sensitive information using regular, unencrypted methods. However, the online and social market has matured to a point where many people are beginning to see the ramifications of the lack of privacy controls online. Many public figures, including many celebrities, are beginning to see very sensitive pictures and documents exposed to the public via online hacking and other illegal methods. In other situations, previously sent text messages and emails are used in legal court proceedings to implicate individuals.

In business use cases, many professional services firms (like accounting, medical, legal, and financial firms) communicate with their clients, and internally with others in their company, via unsecured email. The unsecured documents and materials (e.g. images, text documents, etc.) communicated are generally sensitive in nature and can lead to fraud and identity theft causing significant financial loss and personal angst. In one example, medical patients are beginning to send photos and videos to their doctors through online services. Although the transmission of these files (e.g. photos and videos) may be encrypted, the storage of these files are at times left unencrypted on the computers/servers at the hospital. In another example, businesses may communicate private documents (e.g. financial information, intellectual property, etc.) to and from clients, while also storing these private financial documents on their servers. These private documents are protected by email encryption during transmission, and by firewalls when stored on the servers. However, these private documents are not encrypted themselves. Thus, if someone hacks into an email account or into a file server, these private documents can easily be downloaded and viewed by the hacker.

Figure 1:
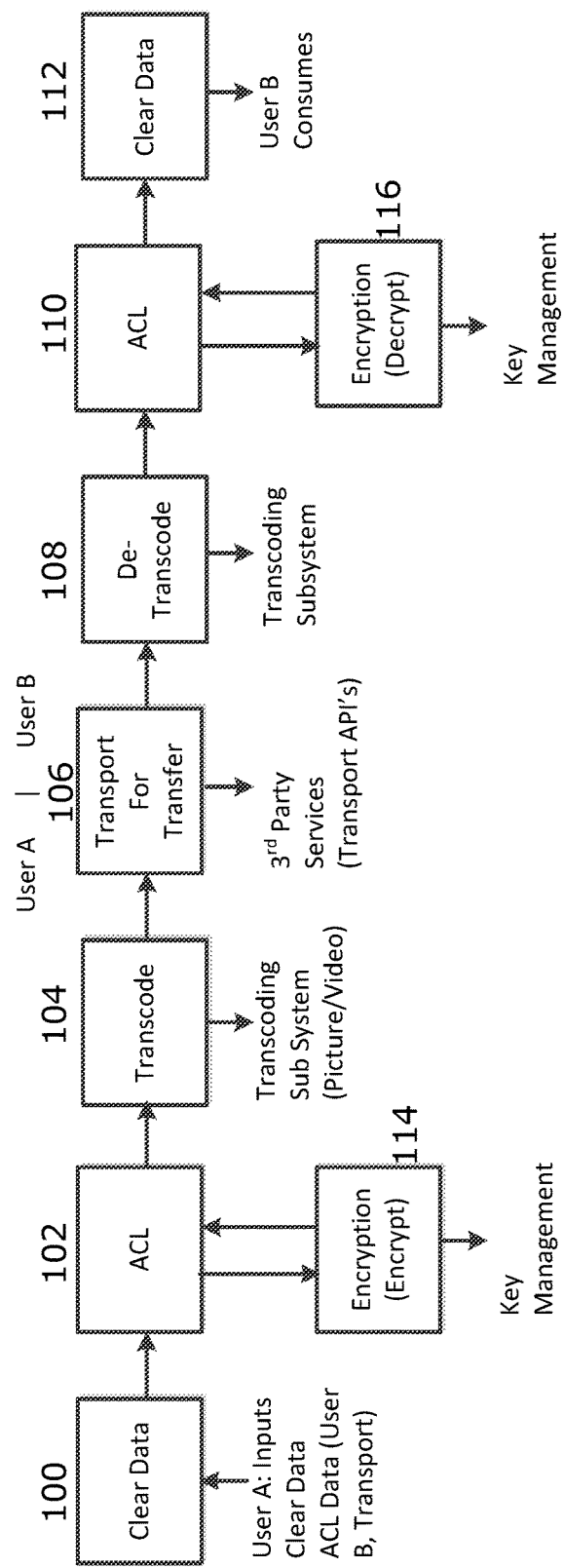
FIG. 1 is an exemplary flow chart depicting transcoding/detranscoding between a single transmitter device and a single recipient device, according to an embodiment or portion of an embodiment of the subject invention.

The drawings are merely schematic representations, not intended to portray specific parameters of the invention. The drawings are intended to depict typical embodiments of the invention, and therefore should not be considered as limiting the scope of the invention.

SUMMARY

In one embodiment, the system includes a data transcoding device including a memory device for storing clear data containing private information, and a processor configured as a data transcoder. The processor is configured to create packets of the clear data, prepare the packets for transcoding the clear data into an indecipherable multimedia data file appearing as noise, by determining properties of the indecipherable multimedia file based on parameters of the clear data. The processor configured to generate the indecipherable multimedia file by transcoding the clear data based on the determined properties.

In another embodiment, the system includes a data detranscoding device including a memory device for storing an indecipherable multimedia file appearing as noise, and a processor configured as a data detranscoder. The processor is configured to extract multimedia data from the indecipherable multimedia file, detect an indecipherable packet of data within the extracted multimedia data, the indecipherable packet of data including indecipherable multimedia data that represents transcoded clear data, and detranscode the indecipherable packet of data to determine the clear data.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

There is a need for an elegant solution capable of securely transmitting data from any file format via online service and applications (e.g. social media platforms). There is also a need for an elegant solution capable of securely storing data from any file format either locally in memory or on a remote server (e.g. cloud). In addition, there exists a need for a data transcoding system, method and application capable of simple integration with existing/dominant email, social, online/offline storage, and web communication protocols.

The described embodiments (also referred to as "Arebus") disclose a novel method, system and application for transcoding any form electronic data (hereafter referred to as "Clear Data") into a multimedia file format (e.g. Arebus generates an image, video, or music file based on the Clear Data) that is indecipherable to the human eye/ear (e.g. looks like or sounds like random noise rather than Clear Data information) and only becomes decipherable as the original Clear Data after detranscoding. As multimedia files have become the near-universal file format for transmission of data across social media platforms, the described embodiments create a method, system and application for the transfer of Clear Data through platforms that are not intended to, are limited to, or do not support the transmission of all file types. This method of transcoding allows applications/services to send and/or store multimedia files without major change to the way the application operates. Basically, output application data files may be transcoded without changing the manner in which the application outputs files (e.g. the transcoding is an add-on step to the output/input of the application). This is especially useful for applications such as social media services that are limited to transmitting multimedia files (i.e. they cannot transmit other types of files).

In addition to transcoding, the described embodiments may incorporate an encryption element into the novel method, system and application, wherein the encryption element separates data from the social media or online services upon which the data is sent or stored. An element of the example method includes encrypting the Clear Data (including messages) prior to the data being sent/stored via the internet/web. For example, once the encrypted data is transcoded into a multimedia file format (e.g. the encrypted Clear Data is used to generate a multimedia file), the transcoded data can be sent or stored on any existing service and be opened just as easily using the Arebus platform without the need for additional support, conventions, or integration.

The described embodiments incorporate technology offering solutions around various novel components: First, Clear Data (encrypted or unencrypted) is transcoded (described in detail below) into a universally accepted multimedia file format (e.g. the Clear Data is used to generate a new multimedia file such as an image file, video file or audio file), which can be sent, posted, or stored online through existing services. Second, (optional) encryption, contact, and key management elements, are tasked with encrypting the Clear Data, and (optionally) using an end user's library of contacts to select who and/or what can access the data. In the encrypted scenario, upon receiving/opening of encrypted file, the Clear Data is extracted from the multimedia file format, then the receiving user authenticates receipt of the data via the contact list platform/key management service, and then encrypted file is decrypted and the Clear Data is presented to the receiving user on their device.

Exemplary, but not exhaustive, examples of the Arebus system/algorithms have been provided below, with reference to corresponding Figures. These examples are for illustration purposes only, and do not in any way limit the applicability, order or right supported in the Arebus disclosure.

FIGS. 1-7 describe numerous algorithms for transcoding (converting Clear Data into an indecipherable multimedia file) and/or detranscoding (converting the indecipherable multimedia file back into the Clear Data) data for secure transmission and/or storage without requiring businesses to modify their existing software (i.e. the transcoding/detranscoding algorithms can be an add-ons to the businesses already existing software). For context, each of the FIGS. 1-7 is described below with respect to a use case.

FIG. 1 provides a scenario is protecting the privacy of a 1:1 communication between two individuals (User A and User B). A use case for the configuration in FIG. 1 includes but is not limited to a private message (e.g. email, IMS, etc.) being communicated between two entities (e.g. users, businesses, applications, etc.).

For example, a first private user may want to send Clear Data in the form of a private text document and a private image to a second private user via email or social media message. In general, Arebus would transcode the private text document and the private image prior to transmission of the email/social media message (convert the Clear Data into an indecipherable multimedia file). The transcoding entails converting the raw data from each file into respective indecipherable multimedia files (e.g. the text document is transcoded into an indecipherable image and the private image is transcoded into another indecipherable image). It should be noted that in some embodiments, the transcoding algorithm is considered a "lossless" algorithm where none of the Clear Data lost during the transcoding phase (e.g. all of the Clear Data is converted into the multimedia file).

The indecipherable images produced by the transcoding are then transmitted to the second private user where they are detranscoded back into the original Clear Data so that they can be viewed (e.g. convert the indecipherable multimedia file back into the Clear Data). It should be noted that prior to detranscoding, the Clear Data cannot be deciphered by the human eye. Thus, even if a hacker intercepts the email or hacks into the recipient's email account, it will be difficult to decipher the private text file and image (i.e. the hacker would see indecipherable images that look like randomly distributed pixels). Although transcoding makes the Clear Data indecipherable, encryption of the data prior to transcoding would add another layer of protection so that it will be even more difficult for the hacker to determine the Clear Data.

In a similar use case, a patient may need to take a picture of a personal medical condition and send it to a doctor at the hospital. The algorithm in FIG. 1 would allow the patient to encrypt (optional), then transcode this private image into an indecipherable image, and then transmit it to their doctor via email, text message, web-site upload, etc. This indecipherable image is then safely stored on the hospital's server until the doctor detranscodes and decrypts (optional) it to the original Clear Data image to perform his/her medical diagnosis. Thus, even if a hacker hacks into the hospital server computer, the hacker would not be able to view the patients personal picture since it is stored in transcoded form.

In step 100, for example, User A, using a transcoding/detranscoding device (e.g. PC, Smartphone, etc.), identifies Clear Data that can include text, pictures, and other content or files. User A then specifies who has the rights to access the Clear Data (User B in the example above) and which $3^{rd}$ party service should be used to deliver that Clear Data (email, text, other channels). User B may be identified as a recipient by selecting the electronic contact information for User B, which may include identification/access to User A's contact lists located on any software/application utilized by User A. In step 102, user B's delivery information is fed to the Access Control List (ACL) which manages multiple items in Arebus including User identities, relationships between User identities/data, address book functions, groupings of identities, and User permissions among others. For example, during operation, the ACL in step 102 may determine (using a permission list) if User A has permission to utilize the encryption/transcoding algorithm. If User A is permitted to utilize the encryption/transcoding algorithm, the process proceeds to the next step. If User A does not have permission to utilize the encryption/transcoding algorithm, the process ceases.

Assuming User A is granted permission by the ACL, the Clear Data is then encrypted in step 114 through the encryption engine (hereafter "Encrypted Data") which provides key management and selects appropriate encryption algorithms which may include symmetric key cryptographic algorithms (e.g. advanced encryption standard (AES), data encryption standard (DES), etc.) and/or public key cryptographic algorithms (e.g. Rivest-Shamir-Adleman (RSA), digital signature services (DSS), Diffie-Hellman, etc.). The Encrypted Data is then transcoded in step 104 to generate an indecipherable multimedia file (hereafter "Transcoded Data") which is used as the universal format for transmission of Clear Data across many third party email, text, social media, and other services. This generated indecipherable multimedia file includes data that is indecipherable to the human eye/ear (e.g. an image, video or audio file that looks/sounds like random noise). The Transcoded Data is transmitted in step 106 through a chosen third party service, and is then received by User B.

Once received by User B, the Transcoded Data is then detranscoded), using a transcoding/detranscoding device (e.g. PC, Smartphone, etc.), in step 108 from the indecipherable multimedia file to the Encrypted Data file, which is then checked against the ACL in step 110 to authenticate User B as the intended recipient. For example, during operation, the ACL in step 110 may determine (using a permission list) if User B has permission to receive the message from User A and utilize the decryption/detranscoding algorithm. If User B is permitted to utilize the encryption/transcoding algorithm (i.e. is the intended recipient), the process proceeds to the next step. If User B does not have permission to utilize the encryption/transcoding algorithm, the process ceases. It should be noted that the ACL in step 102 and the ACL in step 110 (i.e. transmission and reception ACL) include the same transcoding/detranscoding algorithms, encryption/decryption algorithms, digital signature algorithms and respective keys to perform the processing of the data. Assuming User B is permitted by the ACL, then the Encrypted Data file is decrypted in step 116 and the Clear Data is accessible by User B in step 112.

It should be noted that in FIG. 1 (described above), and in FIGS. 2-7 (described below), the detranscoding algorithm is essentially the opposite of the transcoding algorithm (detranscoding is the reverse of transcoding). Thus, the transcoding and detranscoding algorithms (including any secret passwords) should be agreed upon by the transmitter and recipient prior to communications. Further details of these transcoding/detranscoding algorithms are described with respect to FIGS. 10, 13 and 14.

It should be noted that in FIG. 1 (described above) and in FIGS. 2-7 (described below), the encryption/decryption steps and ACL user rights steps are optional. The Clear Data can simply be transcoded and then either securely transmitted to a recipient where it is detranscoded, or securely stored in local or remote memory. The transcoding of the Clear Data may be sufficient to protect the content of the Clear Data from being viewed/utilized by unwanted parties. The encryption and ACL user rights management steps add additional (optional) layers of protection over the Clear Data.

Figure 16:
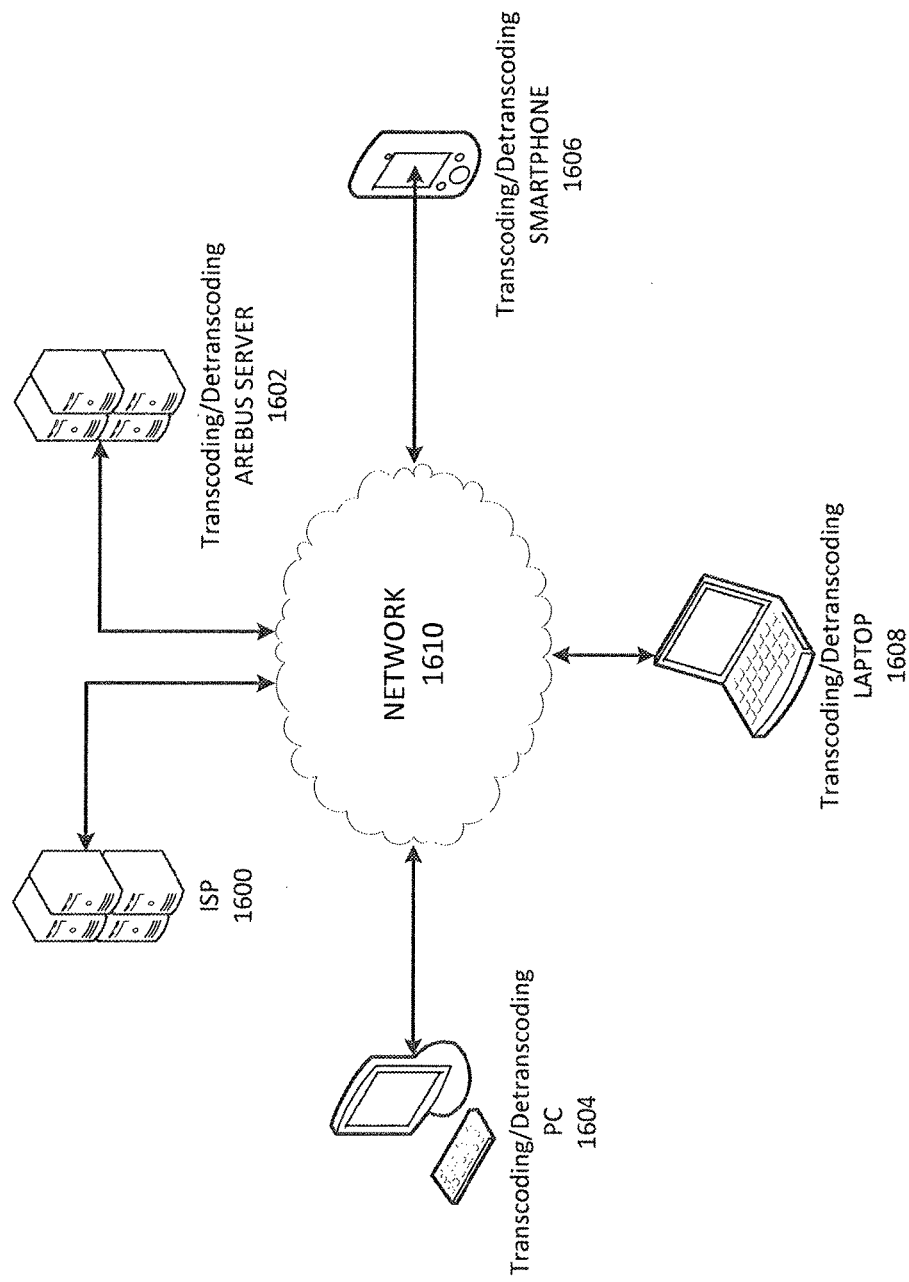
FIG. 16 shows system diagram for transcoding and detranscoding data.

Shown in FIG. 16 is an example system diagram of network communication between User A and User B described FIG. 1 and throughout the remaining Figures. The network system may include end user devices such as personal computer (PC) 1604, Laptop 1608 and SmartPhone 1606 which may be operated by various users. For example, User A may operate PC 1604, and User B may operate SmartPhone 1606. These end user devices communicate with each other and other network devices such as Internet service provider (ISP) server 1600, and Arebus server 1602 via network 1610.

In one example, the transcoding algorithm is performed by the end user device. For example, User A operating PC 1604 may communicate with ISP server 1600 and Arebus server 1602 to download the transcoding/encryption algorithms described with reference to FIGS. 1-7. Once downloaded, PC 1604 performs multimedia file transcoding (e.g. generates an indecipherable multimedia file using the Clear Data), and optionally encryption of the Clear Data, and either transmits this indecipherable multimedia file to SmartPhone 1606 operated by User B, or simply stores this indecipherable multimedia file locally on PC 1604.

In another example, the transcoding algorithm is performed remotely in the server. For example, User A operating PC 1604 may communicate with ISP server 1600 and Arebus server 1602 to upload Clear Data to the Arebus server 1602. Arebus server 1602 then transcodes the Clear Data into an indecipherable multimedia file and then transmits the indecipherable multimedia file back to PC 1604 or to some other designated recipient(s) device such as SmartPhone 1606. In either example, the Clear Data is transcoded into a multimedia file that is indecipherable until detranscoded.

Figure 15:
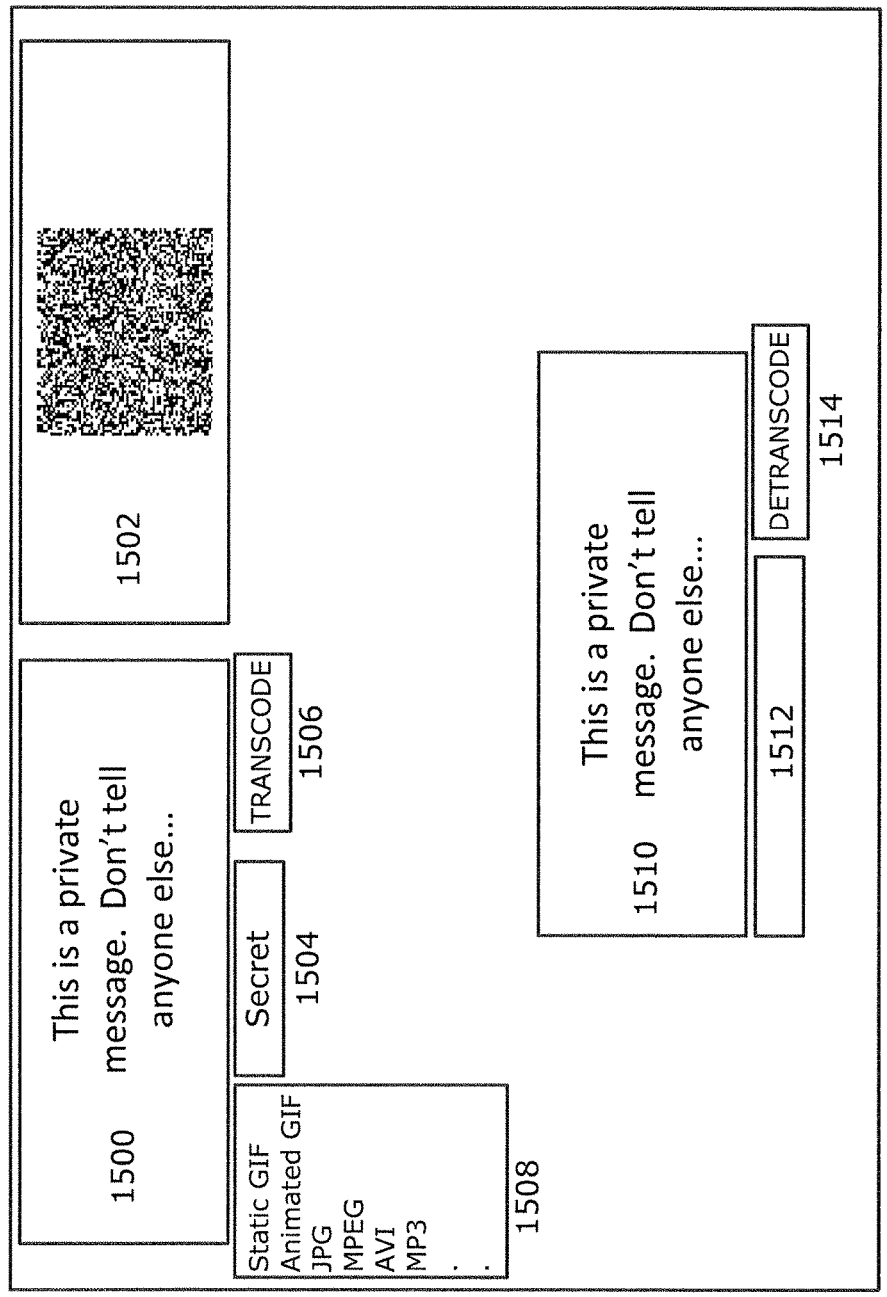
FIG. 15 shows an example of a graphical user interface used for transcoding and detranscoding data.

Shown in FIG. 15 is a graphical user interface (GUI) for performing transcoding of Clear Data into indecipherable multimedia files. The upper portion of the GUI is configured to perform transcoding of Clear Data. This upper portion of the GUI includes a window 1500 for typing Clear Data or dragging and dropping Clear Data files. Also included is a drop down menu 1508 for selecting a type of multimedia file (e.g. PEG, graphics interchange format (GIF), etc.), password window 1504 for selecting a password to use in the transcoding algorithm, button 1506 for triggering the transcoding of the Clear Data, and output window 1502 for displaying the transcoded indecipherable multimedia file.

For example, if User A wants to transcode a Clear Data file such as a private text file, User A can simply drag and drop the text file into window 1500, select a multimedia file type from menu 1508, enter a secret password into window 1504 and then click button 1506. The transcoding algorithm (either performed by PC 1604 or remote server 1602) the transcodes the text file into the selected multimedia file format (e.g. generates a JPEG file based on the Clear Data) and displays this indecipherable multimedia file in window 1502.

In contrast, the lower portion of the GUI is configured to perform detranscoding of the indecipherable multimedia file. This lower portion of the GUI includes a window 1510 to drag and drop the indecipherable multimedia file, window 1512 to enter the secret password and a button 1514 to initiate the detranscoding algorithm.

For example, if User B wants to detranscode a multimedia file (e.g. the JPEG) received from User A, User B can simply drag and drop the JPEG file into window 1510, enter the same secret password that was used for transcoding into window 1512 and then click button 1514. The detranscoding algorithm (either performed by SmartPhone 1606 itself or by remote server 1602) then detranscodes the JPEG back into the Clear Data and displays this Clear Data to User B (i.e. User B can decipher the private text file sent by User A). It should be noted that if JPEG or other compression based file is selected, the Clear Data is supplemented with extra padding (e.g. random bits) to provide enough data to allow the JPEG compression to take place.

Figure 2:
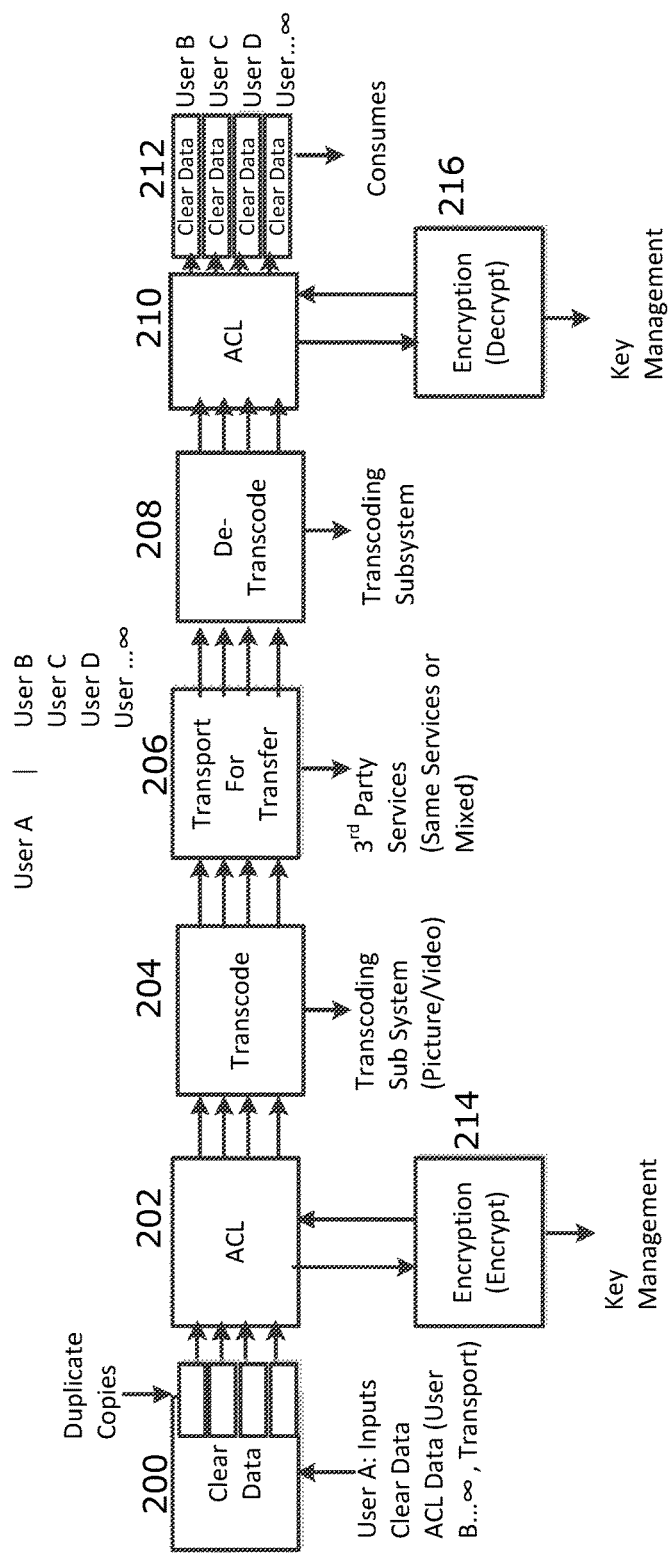
FIG. 2 is an exemplary flow chart depicting transcoding/detranscoding between a single transmitter device and multiple independent recipient devices, according to an embodiment or portion of an embodiment of the subject invention.

The remaining FIGS. 2-7 show other embodiments for performing transcoding and detranscoding, that are variations of the embodiment shown in FIG. 1. For example, FIG. 2 provides another scenario for use of Arebus wherein User A is able transmit the same Clear Data payload to multiple recipients (User B, C . . . ∞) protecting the privacy of the Clear Data between many individuals, wherein each User B, C . . . ∞ might have a different security policy.

A use case for the configuration in FIG. 2 includes but is not limited to a marketing/online advertisement campaigns targeting individuals each having different security policies. For example, a marketing company may want to target multiple individuals (e.g. customers or potential customers) with a common message including the same private text document and a private image (e.g. common advertisement). In general, Arebus would duplicate the Clear Data for each individual, insert ACL security policy rights and then transcode the documents prior to transmission of the private messages (see steps below). The transcoding algorithm entails converting the raw data from each file into respective indecipherable multimedia files (e.g. the text document is transcoded into an indecipherable image and the private image is transcoded into another indecipherable image). These indecipherable images are then transmitted to each of the targeted individuals where they are detranscoded back into the original Clear Data advertisement so that they can be viewed (assuming the targeted individuals have the security policy rights to perform detranscoding).

First, in step 200, User (A) identifies Clear Data that can include text, pictures, and other content or files. User A then specifies individuals who will have the right to access the Clear Data (User B, C . . . ∞) and which third party service(s) should be used to deliver the Clear Data (through email, text, other channels) to each (User B, C . . . ∞). This information is replicated as any times as necessary (number recipients) and fed to the ACL in step 202. In step 214, the Clear Data is then encrypted through the encryption engine using appropriate selected encryption algorithms. The Encrypted Data is then transcoded in step 204 to a selected type of multimedia file format which is used as the universal format for transmission across many third party email, text, social media, and other services. The services used for transmission can be one and the same or mixed across different services. The Transcoded Data is then transmitted in step 206 through the chosen third party service(s) and received by the intended users using the same service. Once received by (User B, C . . . ∞), the transcoded Data is detranscoded in step 208 from the multimedia file to the Encrypted Data file, which is then checked against the ACL in step 210 to authenticate each (User B, C . . . ∞) as the intended recipients. Once authenticated the Encrypted Data file is decrypted in step 216 and the Clear Data is accessible by each individual (User B, C . . . ∞) in step 212. As mentioned earlier, each recipient (Users B, C . . . -∞) can be assigned a different level of security for the Clear Data. Examples of these levels may include: "read only", "read once", "unlimited access", "watermarked", "deleted after a finite amount of time", etc.

Figure 3:
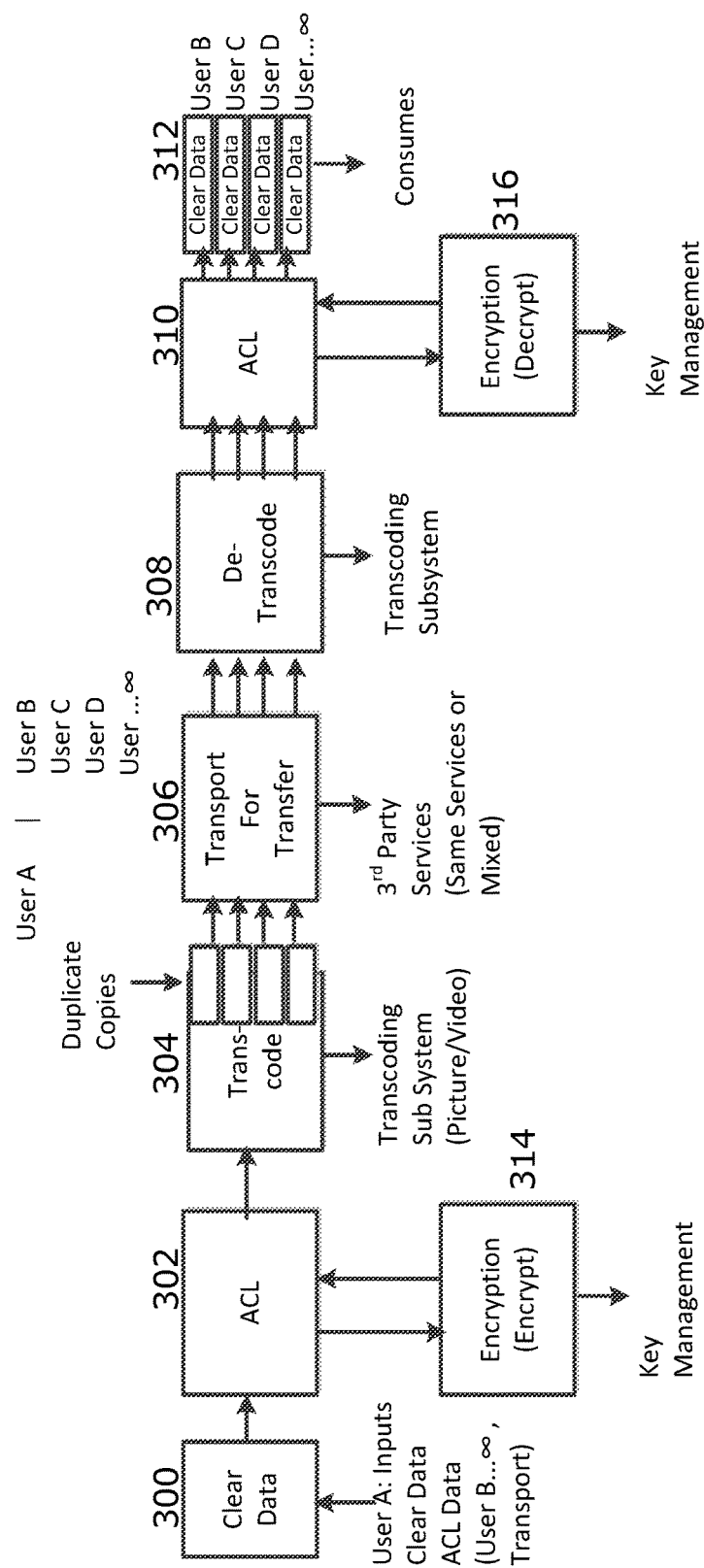
FIG. 3 is an exemplary flow chart depicting transcoding/detranscoding between a single transmitter device and multiple recipient devices in a group, according to an embodiment or portion of an embodiment of the subject invention.

FIG. 3 provides yet another scenario for use of Arebus in transmitting data. The scenario detailed in FIG. 3 is intended to protect the privacy of a conversation between an individual and a group (Users B, C . . . ∞) with a common security policy.

A use case for the configuration in FIG. 3 includes but is not limited to a text message being sent to a group of recipients. For example, a person may want to send a private text message including an image to multiple individuals (User B, C . . . ∞) (e.g. social media friends). In general, Arebus transcodes the text and image of the text message prior to transmission (see steps below). The transcoding algorithm entails converting the raw data from the text message into indecipherable multimedia file (e.g. the text message data is transcoded into an indecipherable image). This indecipherable image is then transmitted to each of the members of the group where it can be detranscoded back into the original Clear Data text message for viewing.

First, in step 300, User (A) identifies Clear Data that can include text, pictures, and other content or files (Clear Data). User A then specifies a group of individuals intended to have collective access to the Clear Data (User B, C . . . ∞ in the example above), and which third party service(s) should be used to deliver the Clear Data (through email, text, other channels). This information is fed into the ACL in step 302. The Clear Data is then encrypted in step 314 through the encryption engine using appropriate selected encryption algorithms. The Encrypted Data is then transcoded in step 304 to multiple multimedia file formats (e.g. picture or video) which are used as the universal format for transmission across to the individuals belonging to the group through the many third party email, text, social media, and other services. The services used for transmission can be one and the same or mixed across different services. The transcoded data is then transmitted in step 306 through the chosen third party service(s) which are received by the individual Users (User B, C . . . -∞) using the same service. Once received, the transcoded data files are detranscoded in step 308 from the multimedia files to the Encrypted Data files, which are then checked against the ACL in step 310 to authenticate the individual Users. Once authenticated the Encrypted Data files are decrypted in step 316 and the Clear Data is consumed by individual Users in step 312.

Figure 4:
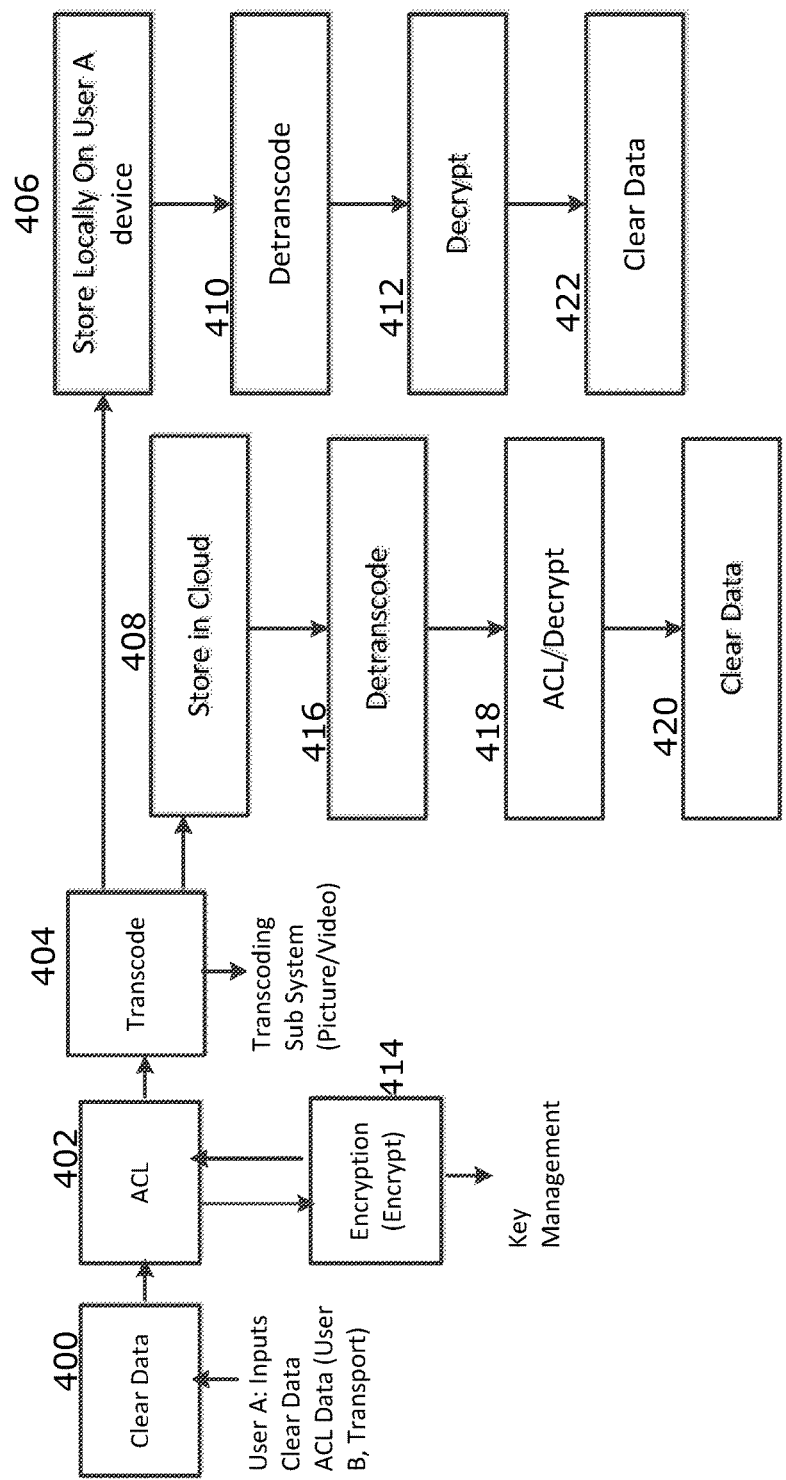
FIG. 4 is an exemplary flow chart depicting transcoding/detranscoding on a user device, according to an embodiment or portion of an embodiment of the subject invention.

The scenario detailed in FIG. 4 is intended to protect the privacy of an individual's data stored locally on the user's device(s) or in a cloud service. A use case for FIG. 4 would be a user storing a private image locally on their smartphone, computer, or remotely in the cloud. For example, when the user takes a picture with their smartphone, this image may be transcoded into an indecipherable image which can then be stored locally on the smartphone or uploaded to a cloud storage server. In either scenario, the transcoded image is secure from being viewed even if the user's smartphone or the cloud server is hacked. When the user wants to retrieve the image from local storage or from the cloud storage, the user's smartphone (or one of the user's other authorized devices), running Arebus, detranscodes the image into the original Clear Data image to be viewed.

In step 400, User A choses the Clear Data that can include text, pictures, and other content or files. User A then specifies that only he/she have access to the Clear Data and where they would like to store the Clear Data. This Clear Data is fed to the ACL in step 402. The Clear Data is then encrypted in step 414 through the encryption engine using appropriate selected encryption algorithms to create the Encrypted Data. The Encrypted Data is then transcoded in step 404 to a multimedia file (picture or video). The Transcoded Data is then stored locally in step 406 and/or in stored the cloud (public, private, or hybrid) in step 408. When User A would like to retrieve the data stored locally from the device, User A simply detranscodes in step 410 and decrypts in step 412 the multimedia file to retrieve the clear data in step 422. When User A or User B would like to retrieve the Data stored in the cloud, the Transcoded Data is detranscoded from the multimedia file in step 416 to the Encrypted Data file, which is then checked against the ACL in step 418 to authenticate the User. Once authenticated the Encrypted Data file is decrypted in step 418, the Clear Data is accessible by User A in step 420. User B cannot decrypt the data, and thus cannot access the Clear Data unless User A shares the encryption key and encryption method. It should be noted that User A can store/retrieve the Data in/from the cloud using multiple devices (e.g. User A could upload the Data to the cloud using their PC and then download the Data from the cloud using their Smartphone). An exemplary use case of this would be an individual taking a private picture and securely storing it on their phone/cloud to protect against local/online hackers exposing the picture to third parties if accessed.

Figure 5:
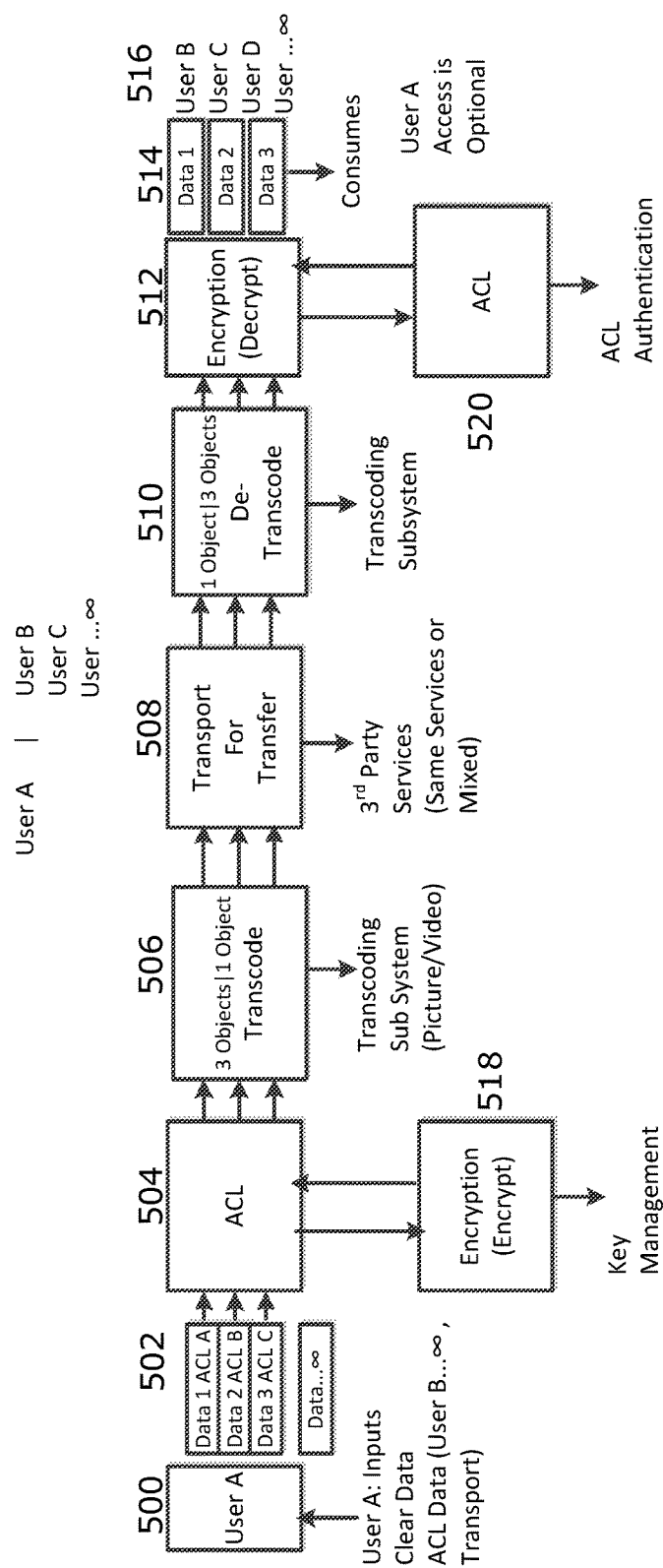
FIG. 5 is an exemplary flow chart depicting transcoding/detranscoding between a single transmitter device and multiple recipient devices, according to an embodiment or portion of an embodiment of the subject invention.

FIG. 5 provides another scenario combining multiple data payloads (e.g. different files) into one transport communication, where each payload has individual security permissions and encryption. A use case for FIG. 5 includes but is not limited to a marketing/online advertisement campaign targeting individuals each having different security policies (similar to FIG. 2). However, in this case, a marketing company may want to target multiple individuals (e.g. customers or potential customers) with private messages or images including a different private text document and a different private image for each individual (i.e. individual advertisements).

In general, Arebus would take each payload message, optionally insert ACL security policy rights, optionally encrypt, and then transcode the documents into one multimedia file prior to transmission of the private messages (see steps below). The transcoding algorithm entails converting the raw data from each file into one combined file which is then transcoding it to an indecipherable multimedia file (e.g. a text document is assigned it's own ACL, another private document is assigned it's own ACL, then the two are combined into one package which is then transcoded to a indecipherable image). This single indecipherable image is transmitted to each of the targeted individuals, where it is detranscoded, and based on their own permission, is accessed.

First, User (A) 500 composes multiple payloads in step 502 sets that can include text, pictures, and other content or files (Clear Data). User A then specifies a group of individuals who have collective access to each Data payload (User B, C . . . ∞ in the example above) and which $3^{rd}$ Party service(s) should be used to deliver the Data (through email, text, other channels). This information is fed to the ACL in step 504. Each payload is individually encrypted through the encryption engine at step 518 and appropriate encryption algorithms are selected. The encrypted data is then transcoded in step 506 to one single multiple multimedia file (e.g. picture, video, audio, etc.) which is used as the universal format for transmission in step 508 across to the individuals belonging to the group through 3$^{rd}$ party email, text, social media, and other services. The services used for transmission can be one and the same or mixed across different services. The multimedia file is then transmitted through the chosen 3$^{rd}$ party services which are received by the individual users using the same service. Once received, in step 510, the files are detranscoded from the multimedia file to the encrypted data files, which are then checked against the ACL in step 520 to authenticate which Data payload is accessible by the individual Users. Once authenticated the specific encrypted data file is decrypted in step 512 and the Clear Data 514 is consumed by the individual Users 516. A use case for the algorithm in FIG. 5 could be a marketing implementation. For example, a marketer can send one file to many potential customers, and custom tailor the content to the customers preferences. Each customer would be limited to detranscoding specific content specified by their rights in the ACL.

Figure 6:
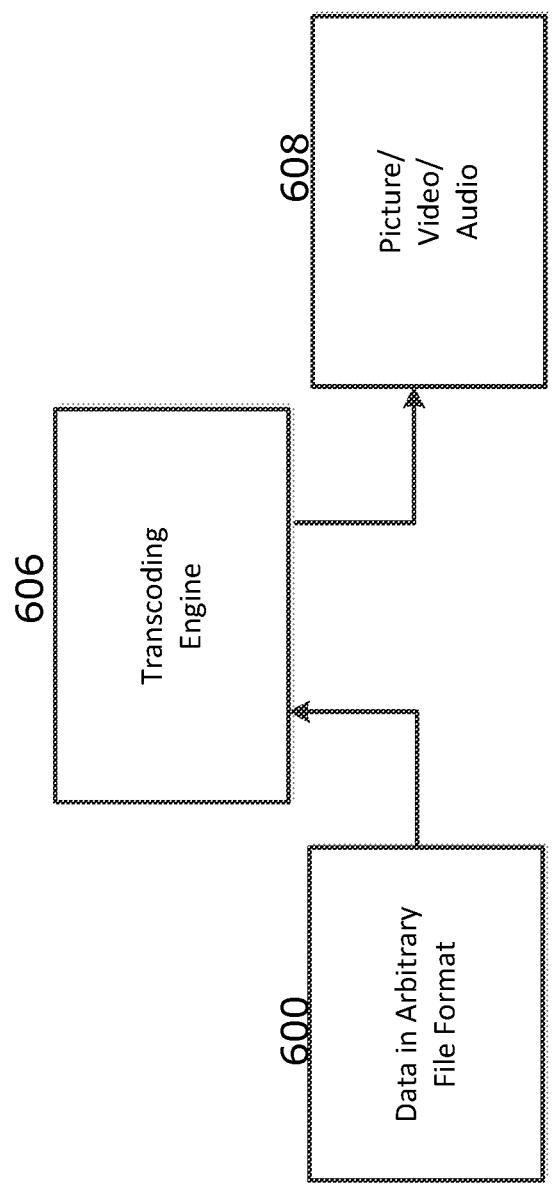
FIG. 6 is an exemplary flow chart depicting transcoding of data into a multimedia file, according to an embodiment or portion of an embodiment of the subject invention.
Figure 9:
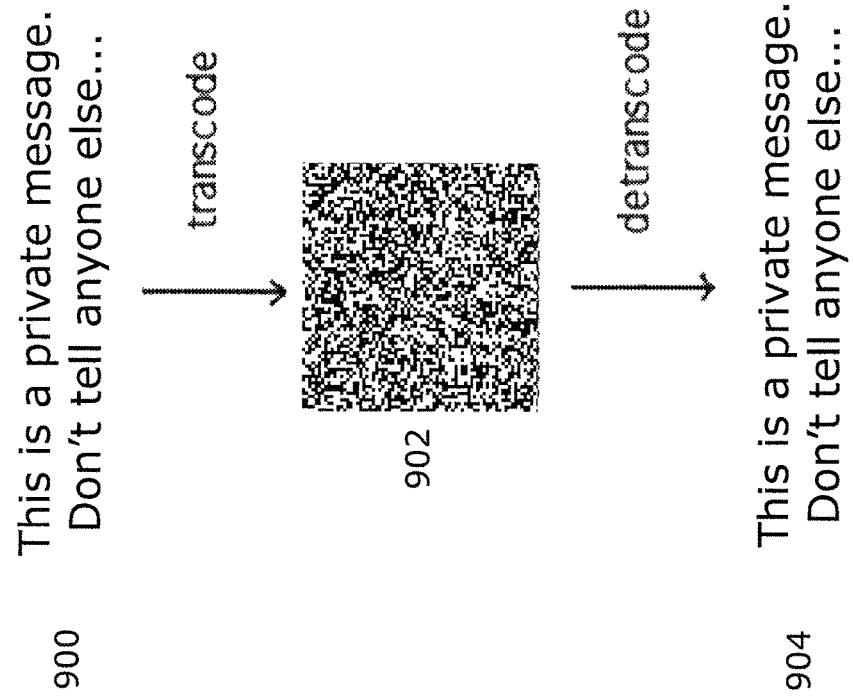
FIG. 9 is an exemplary flow chart depicting transcoding/detranscoding of basic text, according to an embodiment or portion of an embodiment of the subject invention.

Although the scenarios provided above are detailed with the use of a two-step process incorporating encryption of data and transcoding of data, one skilled in the art should appreciate that the encryption process is not essential to the transmission of Clear Data through conventional social media platforms. In fact, depicted in FIGS. 6 and 9, are the transcoding of Clear Data to a multimedia file format for transmission through social media platforms. As before, the recipient of the Transcoded Data uses Arebus to detranscode the Transcoded multimedia file format to Clear Data. Accordingly, any of the scenarios detailed above, as well as any contemplated scenarios for use of Arebus can be accomplished without the encryption and/or ACL element.

For example, FIG. 6 shows that in step 600 data in any arbitrary Clear Data form can be input to the algorithm. In step 606 this Clear Data is transcoded into an indecipherable multimedia file such as a picture, video or audio file as shown in step 608. The transcoding itself could be enough to protect the Clear Data from being deciphered. Encryption, however, would add an additional layer of protection. Furthermore, it is understood that the steps for transmitting Clear Data via online service platforms (social media platforms, medical systems, others), can be reordered without any negative repercussions, as detailed in FIG. 7 and FIG. 8.

Figure 7:
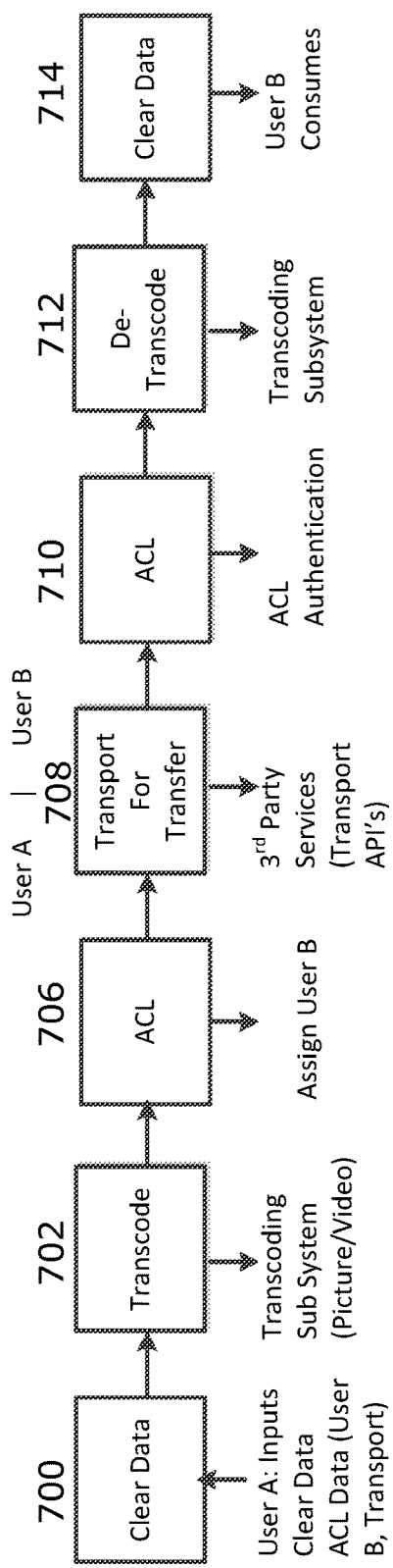
FIG. 7 is an exemplary flow chart depicting transcoding/detranscoding between a single transmitter device and a single recipient device without encryption, according to an embodiment or portion of an embodiment of the subject invention.

FIG. 7, for example, provides a use of Arebus without an encryption element. Accordingly, User (A) identifies Clear Data in step 700 that can include text, pictures, and other content or files. The Clear Data is then transcoded in step 702 to a multimedia file format (hereafter "Transcoded Data") which is used as the universal format for transmission of Clear Data across many third party email, text, social media, and other services. User A then specifies who has the rights to access the Data (User B in the example above) and which third party service should be used to deliver that Data (email, text, other channels). User B may be identified by selecting the electronic contact information for User B, which would include identification/access to User A contact lists located on any software/application utilized by User A. User B's delivery information is fed to the Access Control List (ACL) in step 706 which manages multiple items in Arebus including identity, relationships between identities/data, address book functions, and groupings of identities. The Transcoded Data is then transmitted through the chosen third party service in step 708, which is received by User B. The ACL in step 710 is used to authenticate User B as the intended recipient, and the Transcoded Data file is detranscoded in step 712 from the multimedia file to Clear Data, which is accessible by User B in step 714.

The algorithms described in FIGS. 1-7 transcode Clear Data into an indecipherable multimedia file (e.g. image). A simple visual example of this process is shown in FIG. 9 where Clear Data text 900 is transcoded into an indecipherable image 902 and then detranscoded back into the original Clear Data text 904.

Figure 10:
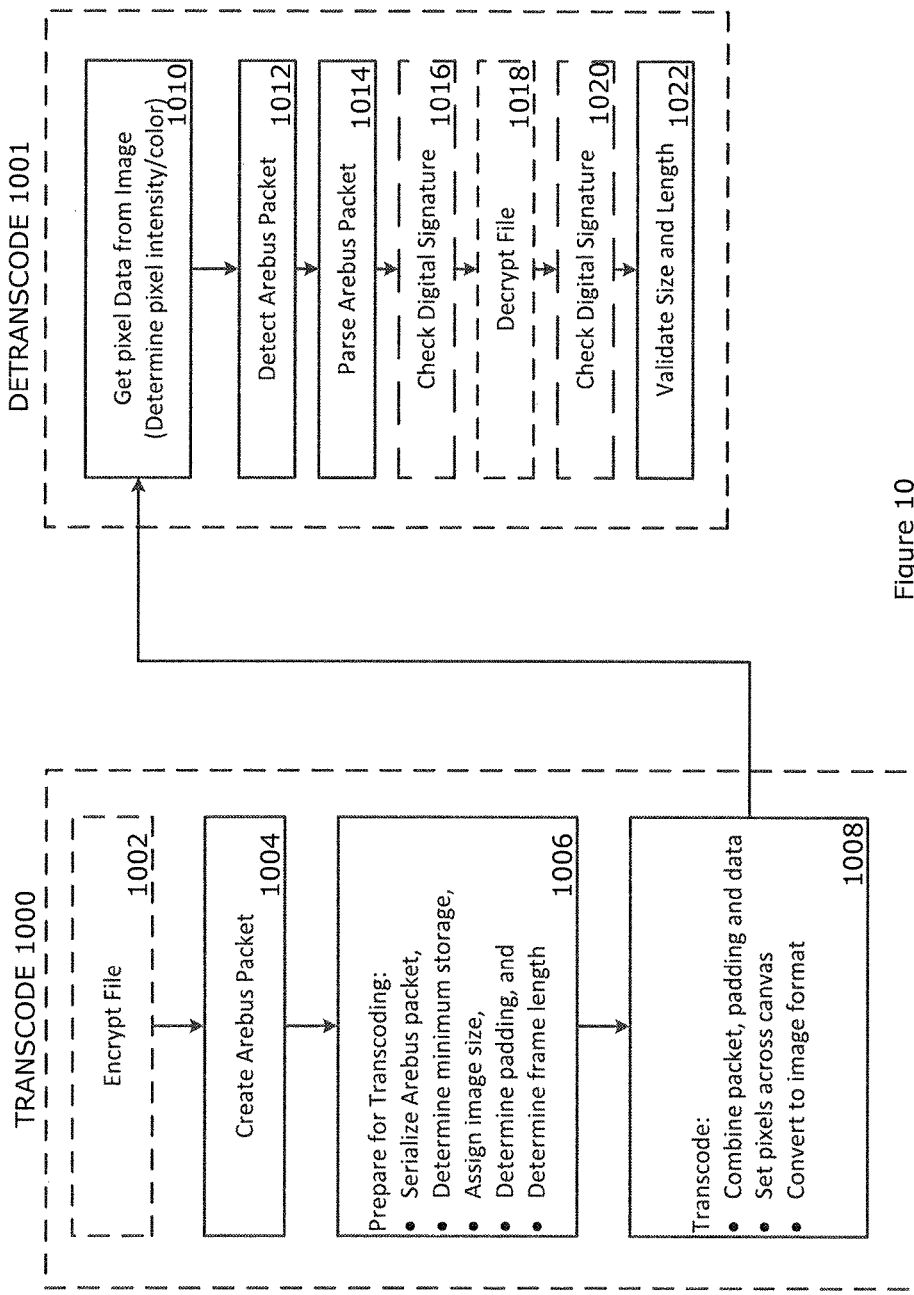
FIG. 10 shows an exemplary flow chart depicting an algorithm for transcoding data as an image file and then detranscoding the data.

Shown in FIG. 10 is a detailed flow chart depicting an algorithm for transcoding data as an indecipherable image file and then detranscoding the data. In the transcoding phase in section 1000, a user device (e.g. PC) may optionally perform encryption (e.g. public key/symmetric key cryptography) of the Clear Data (e.g. text file) in step 1002. It should be noted that encryption step is optional. In step 1004, the user device creates a special packet that defines the various parameters including file size, digital signature (e.g. checksum) of the Clear Data file, and digital signature of encrypted file.

In step 1006, the user device prepares for the transcoding process by determining properties of the multimedia file. For example, the user device may: 1) serializes the special packet(s), 2) determine a minimum amount of storage needed to transcode (e.g. size of special packet+size of encrypted file; The total bits=total pixels needed in transcoded image), 3) assign an image size based on the minimum storage (e.g. 160×160 pixels for animated GIF, for single image gif/jpg/other the file is determined based on total number of pixels needed split between height and width), 3) determine padding necessary for any unused storage within the image size, and 4) determine the total length of the frame to support file size.

In step 1008, the user device performs transcoding using these determined properties. In one example, the user device may: 1) combine packet+padding+data, and 2) set pixels across a canvas, and 3) convert to an image format such as GIF, JPG, portable network graphics (PNG), etc. (e.g. make individual GIFS for each frame, then concatenate the GIFS to an animated GIF).

During detranscoding phase 1001, a user device (e.g. another PC) may: 1) in step 1010 take the image and go through each image and get the pixel data (create an bit array), for example by determining color of each pixel (black pixels=0, white pixels=1) and using fault tolerance to make sure information can be extracted (e.g. pixel values between 0-127 in red-green-blue (RGB) format=0, and pixel values >127 in RGB format=1), 2) in step 1012 detect if the special (e.g. Arebus) packet is present, 3) in step 1014 parse the Arebus packet and determine if it is valid, and parse the encrypted data, 4) in optional step 1016 check digital signature to determine if the included encrypted data is intact, 5) in optional step 1018 decrypt the encrypted data, 6) in optional step 1020 check digital signature to determine if the original data is intact, and 7) in step 1022 check remaining Arebus packet attributes to validate size and digital signature of the Clear Data. If the check in step 1022 validates the Clear Data, the Clear Data is then made accessible to the user.

Figure 8A:
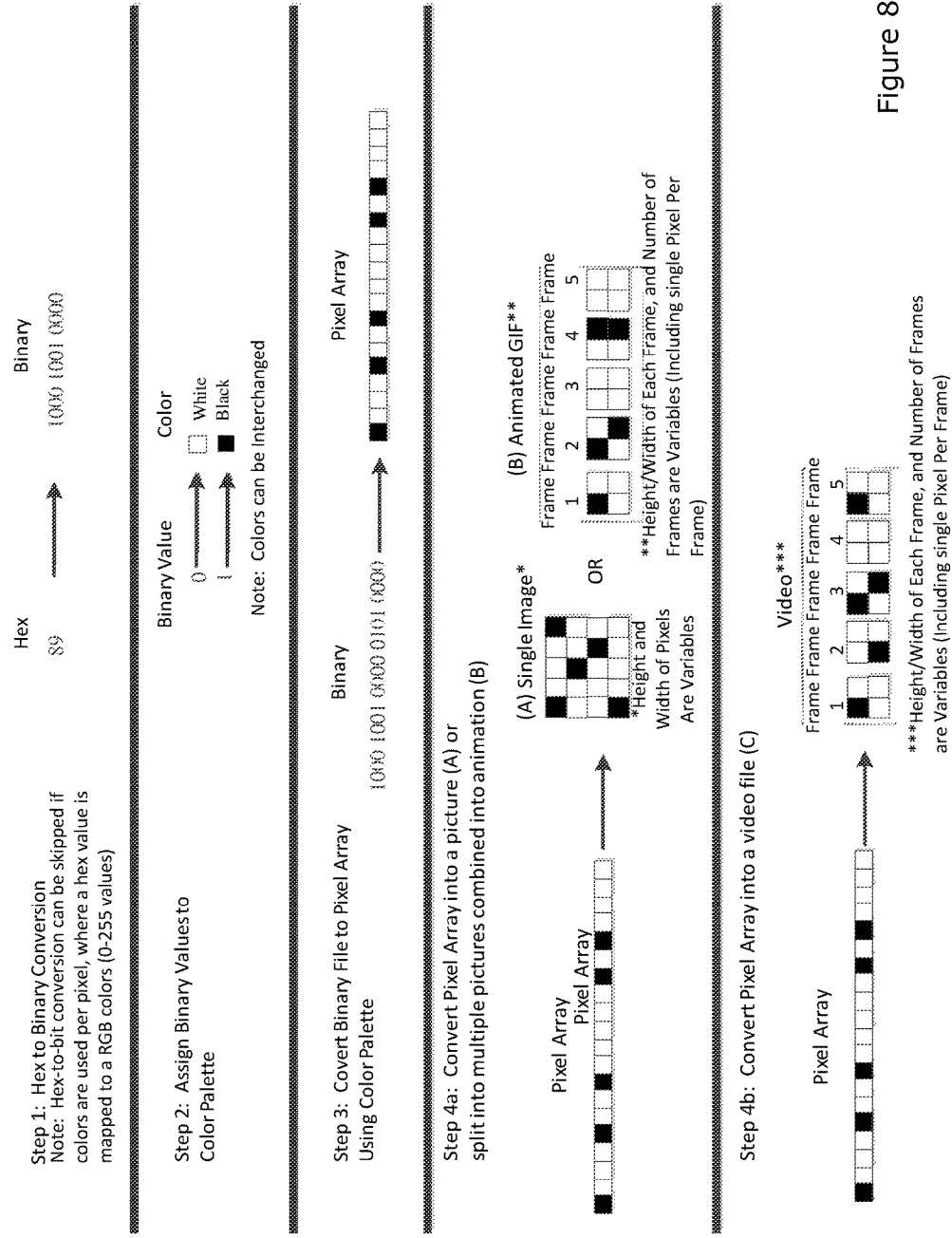
FIG. 8A is an example transcoding Clear Data into an indecipherable image or an indecipherable video file, according to an embodiment or portion of an embodiment of the subject invention.

A simple example of data being processed during the transcoding phase 1001, is shown in steps 1-4*b* of FIG. 8A. In step 1, a hexidecimal to binary conversion may be performed if needed (i.e. if the data is in hexidecimal format). In step 2, the binary values of 0 and 1 are assigned values to a color pallet (e.g. 0 corresponds to a white pixel and 1 corresponds to a black pixel). In step 3 the binary file is converted to a pixel array of black and white pixels. Finally, in step 4a, the pixel array is converted into a single picture. It should be noted that in step 1 if the data is left in hexadecimal form, then the algorithm in step 2 would simply include/assign a larger color pallet (e.g. 256 color pallet) to accommodate all of the hexadecimal possibilities.

Figure 11:
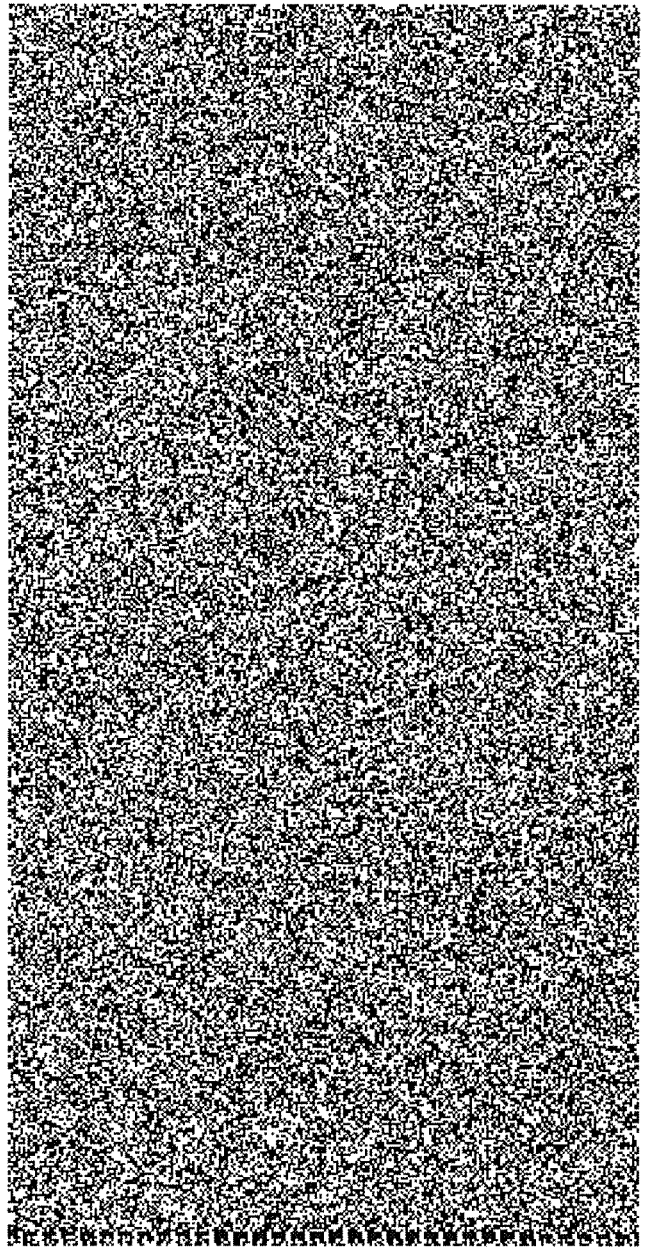
FIG. 11 shows an example of data transcoded as an indecipherable image.

Shown in FIG. 11 is an example of Clear Data transcoded as an indecipherable image. Clear Data (e.g. text file) is input to the transcoding algorithm and transcoded into a black and white image 1100 which appears to be a random distribution of black/white pixels thereby ensuring that the data is indecipherable to the human eye (e.g. the text from the text file cannot be deciphered simply by viewing image 1100).

Figure 12:
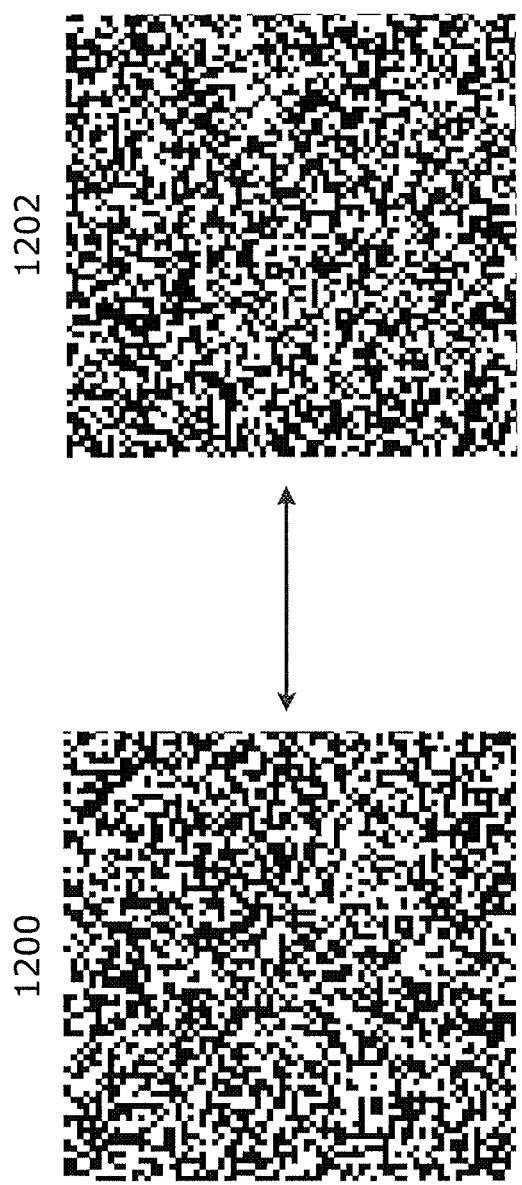
FIG. 12 shows an example of data transcoded as an indecipherable animated GIF.

Shown in FIG. 12 is example of data transcoded as an animated GIF in step 4a of FIG. 8A. Generally, Clear Data (e.g. text file) is input to the transcoding algorithm and transcoded into multiple black and white images 1200 and 1202 which appear to be a random distribution of black/white pixels thereby ensuring that the data is indecipherable to the human eye (e.g. the text from the text file cannot be deciphered simply by viewing image 1100). In this animated GIF example, the images 1200 and 1202 would be two separate frames of the animated GIF. During animation, these frames are alternately displayed to the user (e.g. the display switches back and forth between images at a certain rate).

As described above, the Clear Data can be transcoded into other types of indecipherable multimedia files such as video files and audio files. Described below with reference to FIGS. 13 and 14, the Clear Data is transcoded into an indecipherable video file (e.g. a video that looks like noise) and an indecipherable audio file (e.g. that sounds like noise) respectively.

Figure 13:
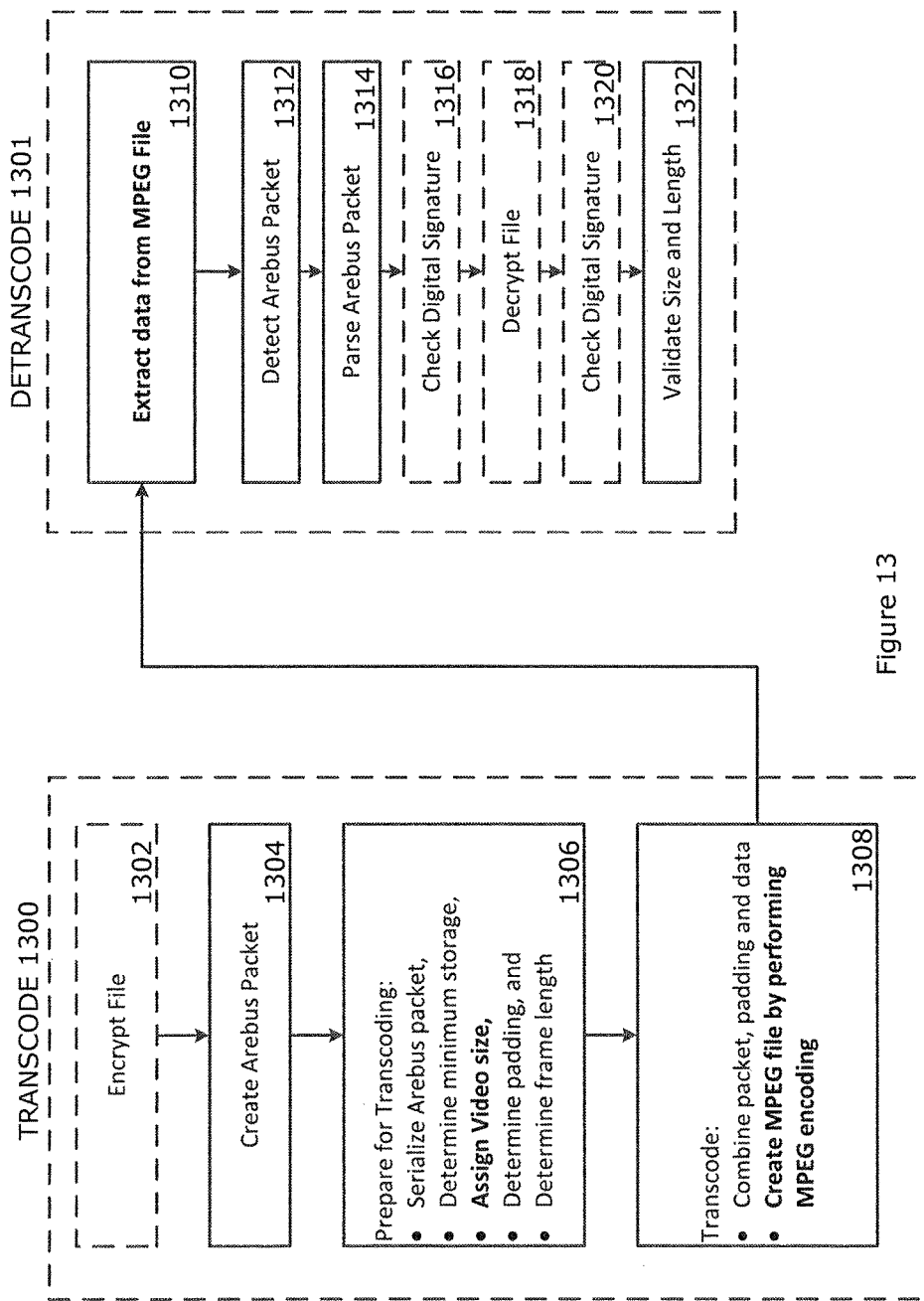
FIG. 13 shows an exemplary flow chart depicting an algorithm for transcoding data as an indecipherable video file and then detranscoding the data.

Shown in FIG. 13 is an exemplary flow chart depicting an algorithm for transcoding data as an indecipherable video file and then detranscoding the data. For transcoding Clear Data into a video file, most of the steps are similar to the steps in the flowchart of FIG. 10. For example, the transcoding phase 1300 performs encryption in optional step 1302, creates an Arebus packet in step 1304, prepares for transcoding by determining properties of the multimedia file in step 1306, performs transcoding based on the determined properties in step 1308, performs detranscoding in the detranscoding phase 1301 by extracting data from the transcoded file in step 1310, detecting the Arebus packet in step 1312, parsing the Arebus packet in step 1314, checking the digital signature in optional step 1316, decrypting the file in necessary in optional step 1318, checking the digital signature in optional step 1320 and validating the size and length of the data in step 1322. If the check in step 1322 validates the Clear Data, the Clear Data is then made accessible to the user.

However, since the data is being transcoded into video, there are some differences. For example, steps 1-3 in FIG. 8A are performed. However, step 4b (converting the pixel array into a video file such as MPEG) is performed instead of step 4a. The opposite process is performed during detranscoding to retrieve the Clear Data. These different transcoding and detranscoding methods occur in steps 1306, 1308 and 1310.

Figure 14:
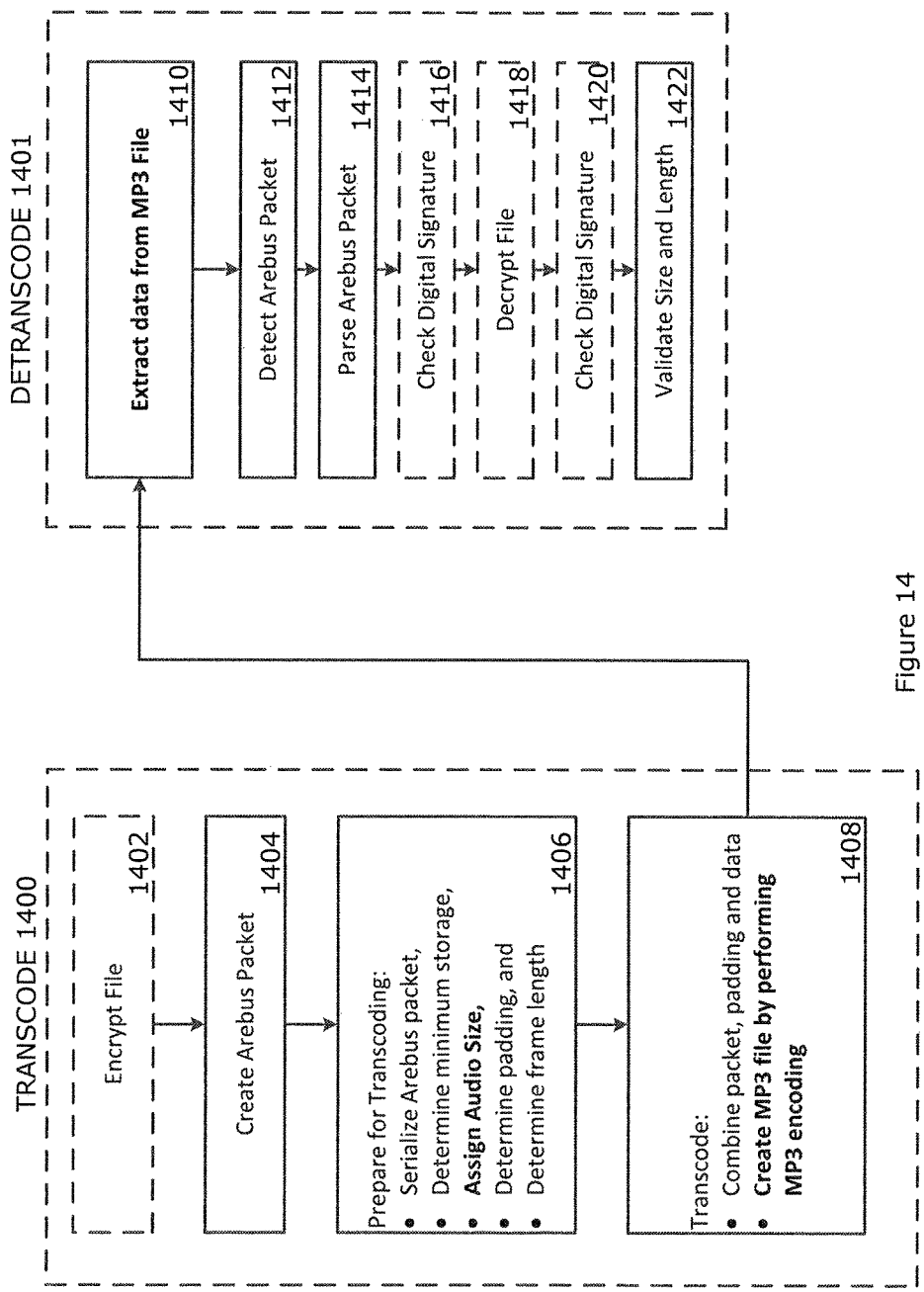
FIG. 14 shows an exemplary flow chart depicting an algorithm for transcoding data as an indecipherable audio file and then detranscoding the data.

Shown in FIG. 14 is an exemplary flow chart depicting an algorithm for transcoding data as an indecipherable audio file and then detranscoding the data. For transcoding Clear Data into an audio file, most of the steps are similar to the steps in the flowchart of FIG. 10. For example, the transcoding phase 1400 performs encryption in optional step 1402, creates an Arebus packet in step 1404, prepares for transcoding by determining properties of the multimedia file in step 1406, performs transcoding based on these determined properties in step 1408, performs detranscoding in the detranscoding phase 1401 by extracting data from the transcoded file in step 1310, detecting the Arebus packet in step 1412, parsing the Arebus packet in step 1414, checking the digital signature in optional step 1416, decrypting the file in necessary in optional step 1418, checking the digital signature in optional step 1420 and validating the size and length of the data in step 1422. If the check in step 1422 validates the Clear Data, the Clear Data is then made accessible to the user.

Figure 8B:
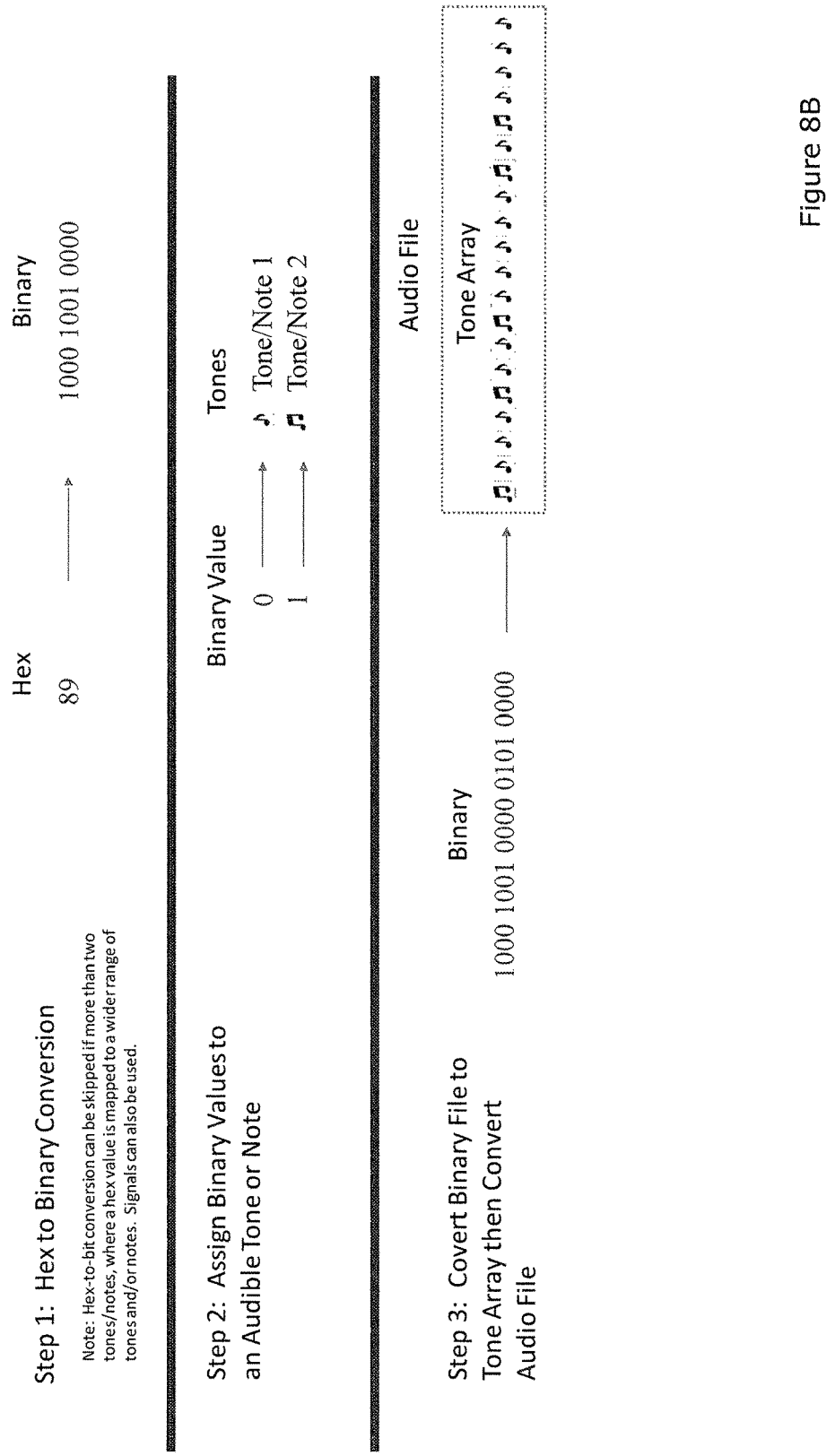
FIG. 8B is an example transcoding Clear Data into an indecipherable audio file, according to an embodiment or portion of an embodiment of the subject invention.

However, since the data is being transcoded into audio, there are some differences. For example, to transcode the data, the steps in FIG. 8B are used. Specifically, in step 1 of FIG. 8B, a hexidecimal to binary conversion may be performed if needed (i.e. if the data is in hexidecimal format). In step 2, the binary values of 0 and 1 are assigned to an audible tone or note (e.g. binary 0 corresponds to tone A and binary 1 corresponds to tone B). In step 3, the binary file is converted to a tone array which is then converted into a compatible audio file (MP3, MP4, etc.). It should be noted that in step 1 if the data is left in hexidecimal form, then the algorithm in step 2 would simply include/assign a wider range of tones to accommodate all of the hexadecimal possibilities. The opposite (i.e. reverse) process is performed during detranscoding to retrieve the Clear Data. These different transcoding and detranscoding methods occur in steps 1406, 1408 and 1410. It should be noted that if a file format that utilizes compression (e.g. MPEG or MP3) is selected, the Clear Data is supplemented with extra padding (e.g. random bits) to provide enough data to allow compression to take place.

Below is an additional exemplary integration of Arebus for use with existing smart phone, desktop, and/or personal digital assistant devices. Accordingly, an end User (User A) opts into Arebus and signs on using a username and password. Arebus becomes prevalent of the end User's existing social media and/or email services, and integrates into the contact list(s) existing on the social media and/or email services. One or more potential recipients (User B(s)) are selected from the contacts list(s) existing on the end User's existing social media and/or email service, and acts as the base for permissions management. Once one or more recipient(s) are identified, then User A selects the data to be sent to the receiving user, and Arebus incorporates security/transcoding prior to handing the data off to the existing social media and/or email service. At the time of encryption/transcoding the data, Arebus assigns permissions, based on User A's directives, for use/viewing/restrictions of the data by User B(s). The transcoded message(s) is then sent to User B(s) where they are detranscoded and decrypted to the original Clear Data assuming User B(s) are authorized based on their assigned permissions.

The inventive method, system and application supports privacy controls for messaging and storage of pictures/videos on desktop and mobile devices. This inventive method, system and application is intended to protect email, text, and business and social media messaging (e.g. Slack, Facebook, Google Hangouts) as well as allow an end user to take their files (including picture/videos) and store them locally and on online services encrypted in existing "camera roll," gallery, or native application specific storage of the electronic device. The inventive method, system and application solves the data at rest issue (people accessing your online accounts or stealing your phone, getting sensitive messages and pictures) and data in transit (messages and pictures being intercepted while being sent through a service).

In addition, for consumers, the inventive method, system and application is capable of protection of all your content online for social media (Facebook wall post, Google+, Tumblr, etc.). The inventive method, system and application enabling the ultimate online content control and kill switch if desired, placing control of the electronic device in the user's hands if the device is stolen or misplaced.

Referring now to the hardware/software components supportive of Arebus, below is an exemplary disclosure of a computer operable system to execute the disclosed Arebus architecture. In order to provide additional context for various aspects of the described embodiments, the following discussion are intended to provide a brief, general description of a suitable computing environment in which the various aspects of the described embodiments can be implemented. While the described embodiments have been described above in the general context of computer-executable instructions and algorithms that may run on one or more computers, those skilled in the art will recognize that the described embodiments can also be implemented in combination with other program modules and/or as a combination of hardware (see the hardware in FIG. 16) and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The described aspects of the embodiments may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

An exemplary environment for implementing various aspects of the embodiments requires a computer, the computer including a processing unit, a system memory and a system bus. The system bus couples system components including, but not limited to, the system memory to the processing unit. The processing unit can be any of various commercially available processors. Dual microprocessors and other multiprocessor architectures may also be employed as the processing unit.

The system bus can be any of several types of bus structure that may further interconnect to a memory bus (with or without a memory controller), a peripheral bus, and a local bus using any of a variety of commercially available bus architectures. The system memory includes read only memory (ROM) and random access memory (RAM). A basic input/output system (BIOS) is stored in a non-volatile memory such as ROM, EPROM, EEPROM, which BIOS contains the basic routines that help to transfer information between elements within the computer, such as during start-up. The RAM can also include a high-speed RAM such as static RAM for caching data.

The computer further may include an internal hard disk drive (HDD) (e.g., EIDE, SATA), which internal hard disk drive may also be configured for external use in a suitable chassis (not shown), a magnetic floppy disk drive (FDD), (e.g., to read from or write to a removable diskette and an optical disk drive, (e.g., reading a CD-ROM disk or, to read from or write to other high capacity optical media such as the DVD). The hard disk drive, magnetic disk drive and optical disk drive can be connected to the system bus by a hard disk drive interface, a magnetic disk drive interface and an optical drive interface, respectively. The interface for external drive implementations includes at least one or both of Universal Serial Bus (USB) and IEEE interface technologies.

The drives and their associated computer-readable media provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the described embodiments.

A number of program modules can be stored in the drives and RAM, including an operating system, one or more application programs, other program modules and program data. All or portions of the operating system, applications, modules, and/or data can also be cached in the RAM. It is appreciated that the described embodiments can be implemented with various commercially available operating systems or combinations of operating systems.

A user (User A, B, C . . . ∞) can enter commands and information into the computer through one or more wired/wireless input devices, e.g., a keyboard and a pointing device, such as a mouse. Other input devices (not shown) may include a microphone, an IR remote control, a joystick, a game pad, a stylus pen, touch screen, or the like. These and other input devices are often connected to the processing unit through an input device interface that is coupled to the system bus, but can be connected by other interfaces, such as a parallel port, an IEEE 1394 serial port, a game port, a USB port, an IR interface, etc.

A monitor or other type of display device is also connected to the system bus via an interface, such as a video adapter. In addition to the monitor, a computer typically includes other peripheral output devices (not shown), such as speakers, printers, etc. The computer may operate in a networked environment using logical connections via wired and/or wireless communications to one or more remote computers, such as a remote computer(s). The remote computer(s) can be a workstation, a server computer, a router, a personal computer, portable computer, microprocessor-based entertainment appliance, a peer device or other common network node, and typically includes many or all of the elements described relative to the computer, although, for purposes of brevity, only a memory storage device is illustrated. The logical connections depicted include wired/wireless connectivity to a local area network (LAN) and/or larger networks, e.g., a wide area network (WAN). Such LAN and WAN networking environments are commonplace in offices, and companies, and facilitate enterprise-wide computer networks, such as intranets, all of which may connect to a global communication network, e.g., the Internet.

When used in a LAN networking environment, the computer is connected to the local network through a wired and/or wireless communication network interface or adapter. The adaptor may facilitate wired or wireless communication to the LAN, which may also include a wireless access point disposed thereon for communicating with the wireless adaptor. When used in a WAN networking environment, the computer can include a modem, or is connected to a communications server on the WAN, or has other means for establishing communications over the WAN, such as by way of the Internet. The modem, which can be internal or external and a wired or wireless device, is connected to the system bus via the serial port interface. In a networked environment, program modules depicted relative to the computer, or portions thereof, can be stored in the remote memory/storage device. It will be appreciated that the network connections shown are exemplary and other means of establishing a communications link between the computers can be used.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g, a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Furthermore, a second exemplary computing environment in accordance with the described embodiments may include one or more client(s). The client(s) can be hardware and/or software (e.g., threads, processes, computing devices). The client(s) can house cookie(s) and/or associated contextual information by employing the described embodiments, for example. The system also includes one or more server(s). The server(s) can also be hardware and/or software (e.g., threads, processes, computing devices). The servers can house threads to perform transformations by employing the described embodiments, for example. One possible communication between a client and a server can be in the form of a data packet adapted to be transmitted between two or more computer processes. The data packet may include a cookie and/or associated contextual information, for example. The system includes a communication framework (e.g., a global communication network such as the Internet) that can be employed to facilitate communications between the client(s) and the server(s).

Communications can be facilitated via a wired (including optical fiber) and/or wireless technology. The client(s) are operatively connected to one or more client data store(s) that can be employed to store information local to the client(s) (e.g., cookie(s) and/or associated contextual information). Similarly, the server(s) are operatively connected to one or more server data store(s) that can be employed to store information local to the servers.

What has been disclosed above includes exemplary uses of the described embodiments. It is, of course, not possible to describe every conceivable combination of elements and/or methodologies for purposes of describing the embodiments, but one of ordinary skill in the art may recognize that many further combinations and permutations of the embodiments are possible. Accordingly, the described embodiments is intended to embrace all such alterations, modifications and variations that fall within the spirit and scope of the disclosure and associated Figures. Furthermore, to the extent that the term "includes" is used in either the detailed description or the specification, such term is intended to be inclusive in a manner similar to the term "comprising" as "comprising" is interpreted when employed as a transitional word.

In addition to those features described above, the embodiments may also have the following features: Business Management UI: A User Interface focused on the needs of the Businesses that use, or integrate with, the system. Most likely this will include some level of API management tools.

Consumer UI: A User Interface focused on the needs of the end consumer that use the system.

Management Bus: Allows all services and UI's to communicate through a universal communication bus. It provides a standardized API for all inter-process communication as well as guaranteed delivery of communications.

ACL: As already described, the ACL contains multiple functions, including identity management as well as rules for object and user interaction, traditional access control list functionality, address book functionality, knowledge of pathing, information that other services need related to what functions are allowed and how they are to be configured or tuned. It may contain any form of rule (business rule) for manipulating, storing, transmitting and transforming data. This is the central database for most of the organizational functions of the system as a whole.

Cron: A service all controls all time-based functions of the system. For example, timing of encryption key expiry, events based on time cadence, timed housekeeping activities, etc.

Analytics and Reporting: A report of the massive web of data and relationships between users.

Identities & Keys: Contains multiple functions, including cryptographic identity and cryptographic key management for the purposes of encryption.

Event Processing: Complex event structures based on system level needs or the needs of the users of the system are processed. Pattern Recognition: The system finds and tracks patterns in users' connections, meta data, transmission patterns, etc.

Transformations: Transforming of data into formats that are almost universally transmittable.

Encryption: Controls all forms of encryption based on input from the Identity and Key management systems including the ACL system. This may include multiple symmetric key cryptography algorithms, as well as multiple asymmetric key cryptography implementations.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A data transcoding device for converting a clear data file into a multimedia file including a video component, having image frames and an audio component, the data transcoding device comprising:
    a memory device for storing the clear data file; and
    a processor configured as a data transcoder, the processor configured to:
    determine a parameters of the clear data file;
    prepare the clear data file for transcoding into the multimedia file, by the determining properties for the multimedia file, the properties for the multimedia file including a number of pixels for each of the image frames and a number of the image frames of the video component based on the parameters of the clear data file; and
    generate the multimedia file by transcoding the clear data file based on the determined properties for the multimedia file and the parameters of the clear data file, wherein the processor is configured to generate the multimedia file by;
    generating a packet including the parameters of the clear data file;
    partitioning the packet and the clear data file into a first plurality of clear data values and a second plurality of clear data values;
    converting the first plurality of clear data values into a plurality of pixel values, responsive to the determined number of pixels for each of the image frames and a number of the image frames of the video component based on the parameters of the clear data file;
    convert the second plurality of clear data values into a respective plurality of audio tone data values;
    concatenate the packet, the plurality of pixel values and the respective plurality of audio tone data values; and
    format the plurality of pixel values as the video component and the respective plurality of audio tone data values as the audio component to generate the multimedia file.

2. The data transcoding device of claim 1, wherein the processor is further configured to encrypt the clear data file or encrypt the multimedia file.

3. The data transcoding device of claim 1, wherein the processor is further configured to store the multimedia file on the data transcoding device or transmit the multimedia file to at least one recipient through a third party service.

4. The data transcoding device of claim 1, wherein the processor is further configured to transmit the multimedia file to multiple recipients or groups of recipients through a third party service.

5. The data transcoding device of claim 1, wherein the processor is further configured to maintain an access control list with user rights and restrict recipient access to the multimedia data based on the user rights.

6. A data detranscoding device for extracting a clear data file from a multimedia file, the multimedia file including a video component and an audio component, the data detranscoding device comprising:
   a memory device for storing the multimedia file; and
   a processor configured as a data detranscoder, the processor configured to:
   extract a plurality of data values including a plurality of pixels values from each of a plurality of image frames of the video component of the multimedia file and a plurality of audio tone values from the audio component of the multimedia file; and
   detranscode the plurality of data values to generate the clear data file, wherein the processor is configured to detranscode the plurality of data values by;
   converting a first portion of the plurality of data values into a data packet, the data packet including parameters of the clear data file;
   converting a second portion of the data values into respective clear data values based on the properties of the multimedia file and the parameters of the clear data file,
   wherein the second portion of the plurality of data values includes the plurality of pixel values from each of the plurality of image frames of the video component and the plurality of audio tones values except for the first plurality data values;
   formatting the clear data values according to the parameters of the clear data file to generate the clear data file.

7. The data detranscoding device of claim 6, wherein the processor is further configured to decrypt the clear data file or decrypt the multimedia file.

8. The data detranscoding device of claim 6, wherein the processor is further configured to receive the multimedia file through a third party service.

9. The data detranscoding device of claim 6, wherein the processor is further configured to receive the multimedia file as part of a group of recipients through a third party service.

10. The data detranscoding device of claim 6, wherein the processor is further configured to store the multimedia file on the data detranscoding device and to restrict access to the stored multimedia file based on user rights.

11. The data detranscoding device of claim 10, wherein the user rights indicate instructions for at least one of read only, read once, and unlimited access to the clear data.

12. The data transcoding device of claim 1, wherein each pixel value of the plurality of pixel values and each audio tone value of the audio tone values has a larger number of bits than the respective clear data value; and
   The processor is further configured to convert the clear data values into the plurality of pixel values and the plurality of audio tone values according to a fault-tolerant mapping.

* * * * *

UNITED STATES PATENT AND TRADEMARK OFFICE
CERTIFICATE OF CORRECTION

PATENT NO. : 10,229,250 B2
APPLICATION NO. : 15/043737
DATED : March 12, 2019
INVENTOR(S) : Zargarian et al.

Page 1 of 1

It is certified that error appears in the above-identified patent and that said Letters Patent is hereby corrected as shown below:

In the Specification

In Column 7, Line 56, delete "PEG," and insert --JPEG,-- therefor

In Column 9, Line 5, delete "co)" and insert --∞)-- therefor

In the Claims

In Column 22, Line 22, in Claim 12, delete "The" and insert --the-- therefor

Signed and Sealed this
Twenty-fifth Day of June, 2019

Andrei Iancu
*Director of the United States Patent and Trademark Office*